US012380897B2

(12) United States Patent
Pascual et al.

(10) Patent No.: US 12,380,897 B2
(45) Date of Patent: Aug. 5, 2025

(54) REAL-TIME PACKET LOSS CONCEALMENT USING DEEP GENERATIVE NETWORKS

(71) Applicant: DOLBY INTERNATIONAL AB, Dublin (IE)

(72) Inventors: Santiago Pascual, Barcelona (ES); Joan Serra, Barcelona (ES); Jordi Pons Puig, Olot (ES)

(73) Assignee: DOLBY INTERNATIONAL AB, Dublin (IE)

( * ) Notice: Subject to any disclaimer, the term of this patent is extended or adjusted under 35 U.S.C. 154(b) by 294 days.

(21) Appl. No.: 18/248,359

(22) PCT Filed: Oct. 14, 2021

(86) PCT No.: PCT/EP2021/078443
§ 371 (c)(1),
(2) Date: Apr. 7, 2023

(87) PCT Pub. No.: WO2022/079164
PCT Pub. Date: Apr. 21, 2022

(65) Prior Publication Data
US 2023/0377584 A1  Nov. 23, 2023

Related U.S. Application Data

(60) Provisional application No. 63/126,123, filed on Dec. 16, 2020, provisional application No. 63/195,831, filed on Jun. 2, 2021.

(30) Foreign Application Priority Data

Oct. 15, 2020 (ES) ................................ ES202031040
Mar. 24, 2021 (ES) ................................ ES202130258

(51) Int. Cl.
*G10L 19/005* (2013.01)
*G06N 3/0455* (2023.01)
(Continued)

(52) U.S. Cl.
CPC .......... *G10L 19/005* (2013.01); *G06N 3/0455* (2023.01); *G06N 3/0475* (2023.01);
(Continued)

(58) Field of Classification Search
CPC ..... G10L 19/005; G10L 19/038; G10L 25/30; G10L 19/017; G10L 19/008;
(Continued)

(56) References Cited

U.S. PATENT DOCUMENTS 8,838,446 B2  9/2014  Jeong
10,332,509 B2  6/2019  Catanzaro
(Continued)

FOREIGN PATENT DOCUMENTS

CN  110136731 A  8/2019
CN  110226201 A  9/2019
(Continued)

OTHER PUBLICATIONS

Andres Marafioti et al., "Gacela—A generative adversarial context encoder for long audio inpainting", arxiv.org, Cornell University Library, 201 Olin Library Cornell University Ithaca, NY 14853, May 11, 2020 (May 11, 2020), XP081929700, DOI: 10.1109/JSTSP.2020.3037506, 15 pages.
(Continued)

*Primary Examiner* — Yogeshkumar Patel

(57) ABSTRACT

The present disclosure relates to a method and system for performing packet loss concealment using a neural network system. The method comprises obtaining a representation of an incomplete audio signal, inputting the representation of the incomplete audio signal to an encoder neural network
(Continued)

and outputting a latent representation of a predicted complete audio signal. The latent representation is input to a decoder neural network which outputs a representation of a predicted complete audio signal comprising a reconstruction of the original portion of the complete audio signal, wherein said encoder neural network and said decoder neural network have been trained with an adversarial neural network.

20 Claims, 10 Drawing Sheets

(51) Int. Cl.
    *G06N 3/0475*     (2023.01)
    *G06N 3/094*     (2023.01)
    *G10L 19/038*     (2013.01)
    *G10L 25/30*     (2013.01)

(52) U.S. Cl.
    CPC ............ *G06N 3/094* (2023.01); *G10L 19/038* (2013.01); *G10L 25/30* (2013.01)

(58) Field of Classification Search
    CPC . G10L 19/0212; G10L 19/0204; G10L 19/04; G10L 2019/0001; G06N 3/0455; G06N 3/0475; G06N 3/094
    See application file for complete search history.

(56) References Cited

U.S. PATENT DOCUMENTS

| | | | |
|---|---|---|---|
| 10,679,643 | B2 | 6/2020 | Diamos |
| 2004/0260550 | A1 | 12/2004 | Burges |
| 2008/0046236 | A1* | 2/2008 | Thyssen ............... G10L 19/0204 704/228 |
| 2014/0358526 | A1 | 12/2014 | Abdelal |
| 2016/0148618 | A1* | 5/2016 | Huang ................. G10L 19/0212 381/2 |
| 2017/0140260 | A1 | 5/2017 | Manning |
| 2018/0247636 | A1 | 8/2018 | Arik |
| 2018/0261214 | A1 | 9/2018 | Gehring |
| 2018/0336880 | A1 | 11/2018 | Arik |
| 2019/0051310 | A1* | 2/2019 | Chang ..................... G10L 25/30 |
| 2019/0197368 | A1 | 6/2019 | Madani |
| 2019/0251952 | A1 | 8/2019 | Arik |
| 2019/0318726 | A1 | 10/2019 | Jin |
| 2019/0371298 | A1 | 12/2019 | Hannun |
| 2020/0066253 | A1 | 2/2020 | Peng |
| 2020/0082817 | A1 | 3/2020 | Narayanan |
| 2020/0126539 | A1 | 4/2020 | Van Den Oord |
| 2020/0175961 | A1 | 6/2020 | Thomson |
| 2020/0243102 | A1 | 7/2020 | Schmidt |
| 2020/0286468 | A1 | 9/2020 | Bengio |

FOREIGN PATENT DOCUMENTS

| | | | |
|---|---|---|---|
| CN | 110634499 | A | 12/2019 |
| CN | 111462735 | A | 7/2020 |
| CN | 111640442 | A | 9/2020 |
| CN | 111292768 | B | 6/2023 |
| WO | WO-2012158159 | A1 * | 11/2012 ........... G10L 19/005 |

OTHER PUBLICATIONS

B.-K. Lee and J.-H. Chang, "Packet Loss Concealment Based on Deep Neural Networks for Digital Speech Transmission," in IEEE/ACM Transactions on Audio, Speech, and Language Processing, vol. 24, No. 2, pp. 378-387, Feb. 2016, doi: 10.1109/TASLP.2015. 2509780, 10 pages.

Barrera, Pablo et al., "Improving Audio Quality in Duo with WaveNetEQ," Blogpost GoogleAI, Apr. 1, 2020, 6 pages.

J. Shen et al., "Natural TTS Synthesis by Conditioning Wavenet on MEL Spectrogram Predictions," 2018 IEEE International Conference on Acoustics, Speech and Signal Processing (ICASSP), Calgary, AB, Canada, 2018, pp. 4779-4783, doi: 10.1109/ICASSP.2018. 8461368, 5 pages.

Marafioti, A. et al., "Audio Inpainting of Music by Means of Neural Networks," Paper No. 10170, AES Convention 146, Mar. 10, 2019, 17 pages.

Mostafa M Mohamed et al: "On Deep Speech Packet Loss Concealment: A Mini-Survey", arxiv.org, Cornell University Library, 201 Olin Library Cornell University Ithaca, NY 14853, May 15, 2020 (May 15, 2020), XP081674545, 5 pages.

Oord Aaron et al: "Neural Discrete Representation Learning", May 30, 2018 (May 30, 2018), XP055845398, Retrieved from the Internet: URL:https://arxiv.org/pdf/1711.00937.pdf [retrieved on Sep. 28, 2021], 11 pages.

P. Verma, A. I. Mezza, C. Chafe and C. Rottondi, "A Deep Learning Approach for Low-Latency Packet Loss Concealment of Audio Signals in Networked Music Performance Applications," 2020 27th Conference of Open Innovations Association (FRUCT), Trento, Italy, 2020, pp. 268-275, doi: 10.23919/FRUCT49677.2020. 9210988, 8 pages.

R. Lotfidereshgi and P. Gournay, "Speech Prediction Using an Adaptive Recurrent Neural Network with Application to Packet Loss Concealment," 2018 IEEE International Conference on Acoustics, Speech and Signal Processing (ICASSP), Calgary, AB, Canada, 2018, pp. 5394-5398, doi: 10.1109/ICASSP.2018.8462185, 5 pages.

R. Prenger, R. Valle and B. Catanzaro, "Waveglow: A Flow-based Generative Network for Speech Synthesis," ICASSP 2019—2019 IEEE International Conference on Acoustics, Speech and Signal Processing (ICASSP), Brighton, UK, 2019, pp. 3617-3621, doi: 10.1109/ICASSP.2019.8683143, 5 pages.

Y. Qian, Y. Fan, W. Hu and F. K. Soong, "On the training aspects of Deep Neural Network (DNN) for parametric TTS synthesis," 2014 IEEE International Conference on Acoustics, Speech and Signal Processing (ICASSP), Florence, Italy, 2014, pp. 3829-3833, doi: 10.1109/ICASSP.2014.6854318, 5 pages.

Y. Shi, N. Zheng, Y. Kang and W. Rong, "Speech Loss Compensation by Generative Adversarial Networks," 2019 Asia-Pacific Signal and Information Processing Association Annual Summit and Conference (APSIPA ASC), Lanzhou, China, 2019, pp. 347-351, doi: 10.1109/APSIPAASC47483.2019.9023132, 5 pages.

Pascual et al., "Adversarial Auto-Encoding for Packet Loss Concealment," 2021 IEEE Workshop on Applications of Signal Processing to Audio and Acoustics (WASPAA), Oct. 2021, p. 71-75, 6 pages.

* cited by examiner

REAL-TIME PACKET LOSS CONCEALMENT USING DEEP GENERATIVE NETWORKS

CROSS-REFERENCE TO RELATED APPLICATIONS

This application is a U.S. National Stage application under U.S.C. 371 of International Application No. PCT/EP2021/078443, filed 14 Oct. 2021, which claims priority of the following priority applications: Spanish application P202031040, filed 15 Oct. 2020; U.S. provisional application 63/126,123, filed 16 Dec. 2020; Spanish application P202130258, filed 24 Mar. 2021 and U.S. provisional application 63/195,831, filed 2 Jun. 2021, each of which is which are hereby incorporated by reference in its entirety.

TECHNICAL FIELD

The present disclosure relates to a method for performing packet loss concealment using neural network system, a method for training a neural network system for packet loss concealment and a computer implemented neural network system implementing said method.

BACKGROUND

Most implementations within the field of communication technology operate under constrained real-time conditions to ensure that users do not experience any delay or interruptions in the communication. The Voice over Internet Protocol (VoIP) is one example of a communication protocol that operates under strict real-time conditions to enable users to have a natural conversation. To fulfil the strict conditions VoIP and similar communication protocols rely on, a steady stream of packets, each carrying a portion of the communication signal, that are continuously and without interruptions transmitted from a sending entity to a receiving entity. However, in practice packets are often delayed, delivered to the receiving entity in a wrong order, or even lost entirely, introducing distortions and interruptions in the communication signal that are noticeable and that degrade the communication quality experienced by users.

To this end there is a need for an improved method of performing Packet Loss Concealment (PLC).

SUMMARY

Previous solutions for performing packet loss concealment involve replicating the structure of the most recent packet and employing audio processing, causing the signal energy to decay to naturally extend the duration in time of the latest packet in lieu of a next packet. However, while the previous solutions decrease the noticeability of lost packets to some extent, the interruptions of the communication signal still impedes on the communication signal quality and, especially for long interruptions, users can still perceive distortions in the communication signal even after PLC processing.

To this end, it is an object of the present disclosure to provide an improved method and system for performing packet loss concealment.

According to a first aspect of the disclosure, there is provided a method for packet loss concealment of an incomplete audio signal where the incomplete audio signal includes a substitute signal portion replacing an original signal portion of a complete audio signal. The method includes obtaining a representation of the incomplete audio signal and inputting the representation of the incomplete audio signal to an encoder neural network trained to predict a latent representation of a complete audio signal given a representation of an incomplete audio signal. The encoder neural network outputs a latent representation of a predicted complete audio signal, and the latent representation is input to a decoder neural network trained to predict a representation of a complete audio signal given a latent representation of a complete audio signal, wherein the decoder neural network outputs a representation of the predicted complete audio signal comprising a reconstruction of the original portion of the complete audio signal, wherein the encoder neural network and the decoder neural network have been trained with an adversarial neural network.

With a substitute signal portion it is meant a signal portion which replaces (is a substitute of) a corresponding (real) portion of a complete audio signal. For example, the substitute signal portion may be a silent (zero) signal portion which indicates that a portion of the signal has been lost, is corrupted or is missing. While a zero signal is commonly used to indicate a portion of a signal which has not been received or is missing other substitute signal portions may be employed, e.g. sawtooth signal of a certain frequency or any other predetermined type of signal which has been established to represent a substitute signal portion in lieu of the actual signal portion of the complete audio signal. In some implementations, the missing signal portion is indicated as metadata to enable distinguishing of the substitute signal portion from e.g., an actual completely silent (zero) signal portion.

In some implementations the method further comprises quantizing the latent representation of the complete audio signal to obtain a quantized latent representation, wherein the quantized latent representation is formed by selecting a set of tokens out of a predetermined vocabulary set of tokens. At least one token of the quantized latent representation is used to condition a generative neural network, wherein the generative neural network is trained to predict a token of the set of tokens provided at least one different token of the set of tokens wherein the generative latent model outputs a predicted token of the latent representation and a confidence metric associated with the predicted token. Based on the confidence of the predicted token, a corresponding token of the quantized latent representation is replaced with the predicted token of the generative model to form a corrected set of tokens (corrected quantized representation) which is provided to the decoder neural network.

The above described neural network system comprises a deep causal adversarial auto-encoder formed by the encoder neural network and the decoder neural network which have learned together to generate a representation of a reconstructed complete audio signal provided an incomplete audio signal. The causal auto-encoder is a non-autoregressive model that may predict an arbitrarily long signal portion (e.g. spanning several packets) with a single inference step. In some implementations the decoder outputs a waveform representation directly and, due to the adversarial training, the outputted waveform may be a very accurate reconstruction of the complete audio signal. The causal auto-encoder may generate reconstructed complete audio signals wherein the substitute signal portion is beyond 100 milliseconds on the contrary to most existing models that make the generation frame-by-frame using an autoregressive loop.

There is no time dependency in the causal auto-encoder meaning that the model may output any length of reconstructed audio signal (at any sample rate) in one single feed-forward step, contrarily to the majority of state of the art packet loss concealment solutions that employ some form of autoregressive loop from output to input. With the optional generative latent model the packet loss concealment performance for long duration losses may be enhanced. Additionally, the causal auto-encoder is deterministic meaning that a same input will yield a same output. Nevertheless, the causal auto-encoder may be referred to as a generator in a generator-adversarial training setup as the causal auto-encoder generates data which emulates real data. This is in contrast to other generators which rely on a random variable to perform the generation of new data which would not make for a deterministic process.

In some implementations the causal auto-encoder is assisted by a generative latent model which operates on a quantized latent representation of the causal auto-encoder. The generative latent model especially enables signal reconstruction on longer terms e.g., beyond 100 milliseconds, but also enables facilitated reconstruction for reconstructions of any length.

According to a second aspect of the disclosure there is provided a computer implemented neural network system for packet loss concealment of an audio signal, wherein the audio signal comprises a substitute signal portion replacing an original signal portion of a complete audio signal. The system includes an input unit, configured to obtain a representation of the incomplete audio signal and an encoder neural network trained to predict a latent representation of a complete audio signal given a representation of an incomplete audio signal, and configured to receive the representation of the incomplete audio signal and output a latent representation of a predicted complete audio signal. The neural network system further includes a decoder neural network trained to predict a representation of a complete audio signal given a latent representation of a reconstructed complete audio signal, and configured to receive the latent representation of the predicted complete audio signal and output a representation of a reconstructed complete audio signal and an output unit configured to output a representation of the predicted complete audio signal including a reconstruction of the original portion of the complete audio signal, wherein the encoder neural network and the decoder neural network have been trained with an adversarial neural network.

According to a third aspect of the disclosure, there is provided a method for training a neural network system for packet loss concealment, the method including obtaining a neural network system for packet loss concealment,
   obtaining a discriminator neural network, obtaining a set of training data, and training the neural network system in conjunction with the discriminator neural network using the set of training data in generative-adversarial training mode by providing the set of training data to the neural network system, and
   providing an output of the neural network system to the discriminator neural network. In some implementations the discriminator comprises at least two discriminator branches operating at different sampling rates and the method further includes determining an aggregate likelihood indicator based on an individual indicator of the at least two discriminator branches.

The disclosure according to the second and third aspects features the same or equivalent embodiments and benefits as the disclosure according to the first aspect. For example, the encoder and decoder of the neural network system may have been trained using a discriminator with at least two discriminator branches operating at different sample rates. Further, any functions described in relation to a method, may have corresponding structural features in a system or code for performing such functions in a computer program product.

BRIEF DESCRIPTION OF THE DRAWINGS

Exemplifying embodiments will be described below with reference to the accompanying drawings, in which.

DETAILED DESCRIPTION

Figure 1:
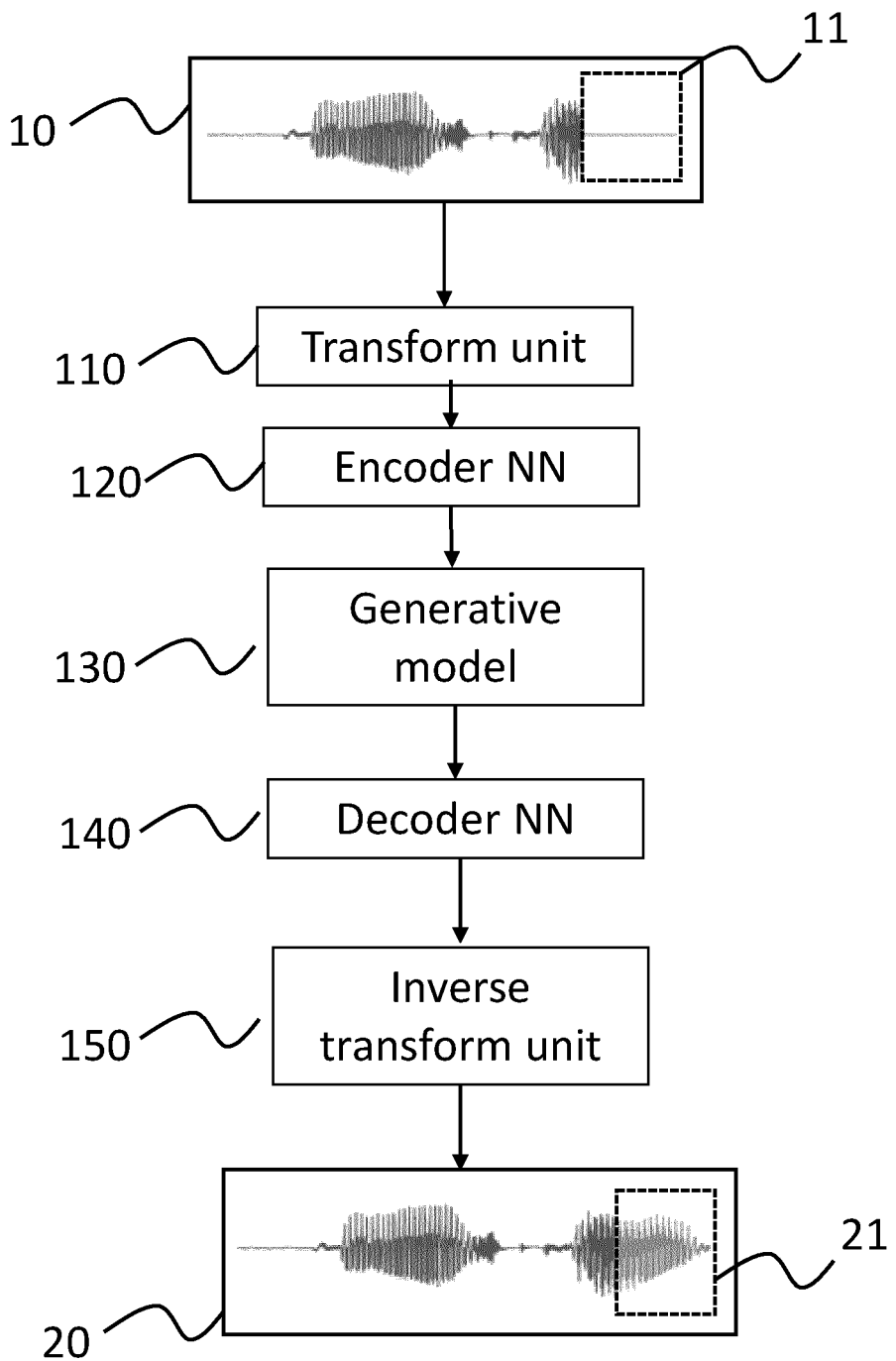
FIG. 1 shows a causal auto-encoder implementing an encoder and decoder neural network according to embodiments of the present disclosure.

FIG. 1 illustrates schematically the causal adversarial auto-encoder (causal auto-encoder). An incomplete audio signal 10 comprising a substitute signal portion 11 is input to the causal adversarial auto-encoder optionally via a transform unit 110. The transform unit 110 transforms the incomplete audio signal 10 into a representation of the incomplete audio signal 10. For example, the transform unit 110 may transform a time domain (waveform) representation of the incomplete audio signal 10 into a representation format chosen from a group comprising: a frequency domain representation, a time representation, a filter bank representation and a feature domain representation. Examples of such representations include a Mel-frequency cepstral coefficient representation or a short-time Fourier transform representation. The encoder neural network 120 may obtain the representation of the incomplete audio signal 10 from the transform unit 110. Alternatively, the incomplete audio signal 10 is obtained directly, e.g. in a waveform time domain representation, by the encoder neural network 120.

The incomplete audio signal 10 may be subdivided into one or more frames with the encoder neural network 120 accepting one or more frames for each inference step. For example, the encoder neural network 120 may have a receptive field of 600 milliseconds wherein a short-time Fourier transform (STFT) spectral frame is generated from the incomplete audio signal 10 with an interval of 10 milliseconds with some overlap (resulting in a signal sampled at 100 Hz), meaning that the encoder neural network 120 accepts 60 frames for each inference step. The incomplete audio signal 10 may further be divided into a set of packets wherein each packet comprises one or more frames or a representation of a portion of the complete audio signal. If one or more packets from the set of packets is omitted (which occurs during a packet loss) a signal portion and/or one or more frames which were present in the complete audio signal is unavailable, and the incomplete audio signal 10 is thereby a representation of the available information with a substitute signal portion 11 replacing the signal portion(s) of the complete audio signal that is/are unavailable.

The encoder neural network 120 is trained to predict and output a latent representation of the reconstructed complete audio signal 20. That is, the latent representation of the reconstructed complete audio signal 20 is a prediction of the original complete audio signal given the incomplete audio signal 10 (or a representation thereof), wherein the reconstructed complete audio signal 20 comprises a reconstructed signal portion 21 replacing the substitute signal portion 11 of the incomplete audio signal 10. The latent representation may be quantized and processed using a generative model 130 which will be described in detail in relation to FIG. 2. Optionally, the latent representation is provided as an input to the decoder neural network 140 which may be trained to predict the time representation (e.g. the waveform) of the reconstructed complete audio signal 20 directly irrespectively of if the encoder neural network 120 received a waveform representation or any other representation of the incomplete audio signal 10. Alternatively, the decoder neural network 140 may output a representation of the reconstructed complete audio signal 20 which is converted to a waveform representation by an optional inverse transform unit 150.

The receptive field of the encoder neural network 120 is preferably wide enough to capture a long context so as to be resilient to recent signal losses that may occur in proximity to a current signal portion which is to be reconstructed. The receptive field may be approximately 600 milliseconds and reducing the receptive field (e.g. to 100 milliseconds) may reduce the reconstruction quality.

Figure 2:
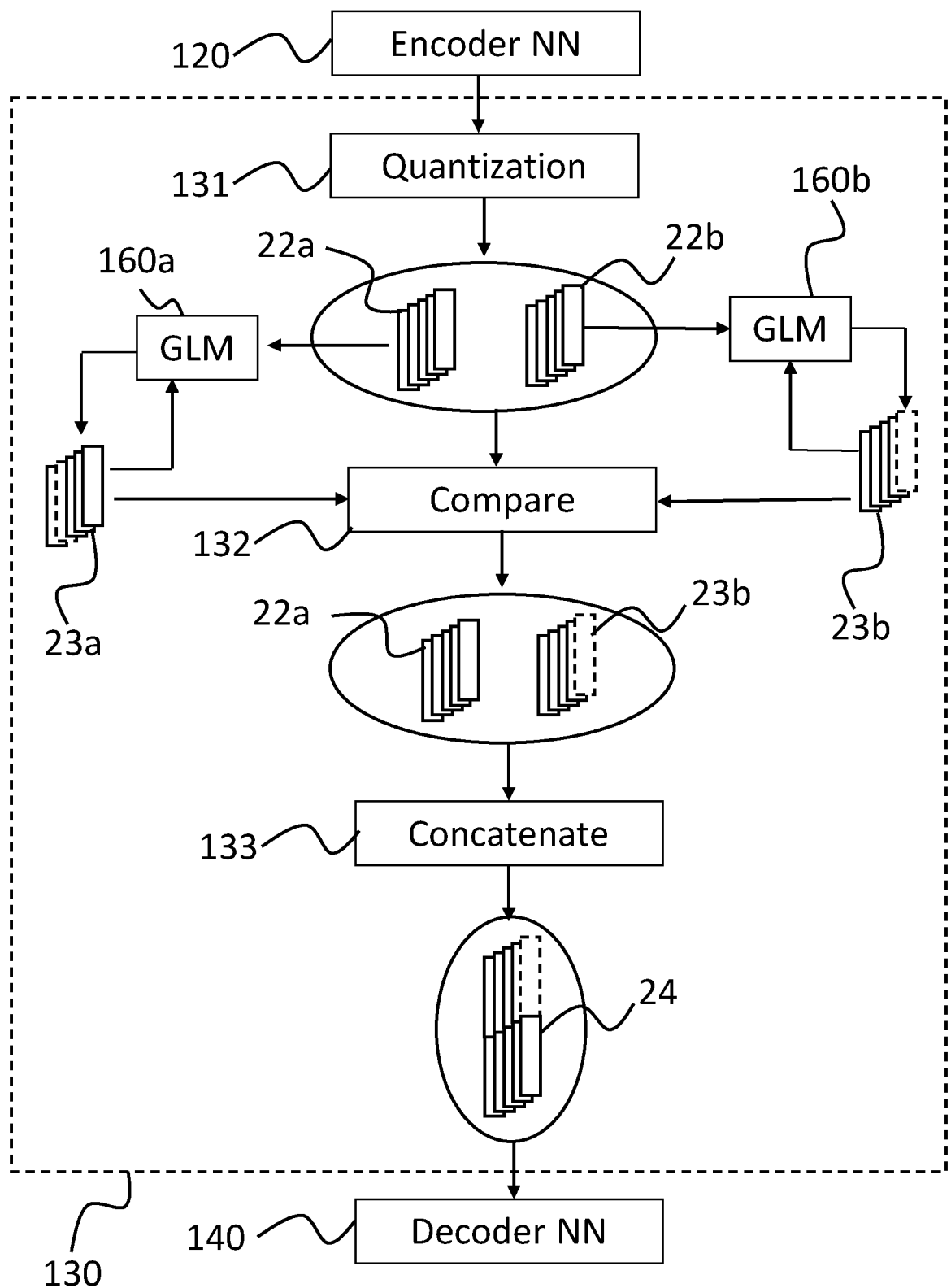
FIG. 2 shows a detailed view of a generative model operating on the latent representation outputted by the encoder neural network according to some embodiments of the present disclosure.

FIG. 2 illustrates the optional quantization and generative model 130 of the causal auto-encoder. The optional generative latent model (GLM) 160a, 160b operates autoregressively on a quantized representation 22a, 22b of the latent representation. As apparent in FIG. 2 the GLM 160a, 160b operates in the latent representation domain. The latent representation may be referred to as the context domain in which the audio signal e.g. is represented with context vectors.

The latent representation output by the encoder neural network 120 is fed to a quantization block 131. The quantization block 131 performs at least one transformation of the latent representation to form at least one quantized latent representation 22a, 22b. In some implementations the quantization block 131 performs at least one linear transformation of the latent representation to form at least one quantized latent representation 22a, 22b. In some implementations, the quantization block 131 performs quantization of the latent representation by selecting a predetermined number of tokens to represent the latent representation, wherein the tokens are selected from a from a predetermined vocabulary of possible tokens. For instance, the quantization may be a vector quantization wherein a predetermined number of quantization vectors are selected from a predetermined codebook of quantization vectors to describe the latent representation as a quantized latent representation 22a, 22b.

In some implementations, the quantization of quantization block 131 comprises selecting a first set of tokens from a first vocabulary forming a first quantized representation 22a and selecting a second set of tokens from a second (different) vocabulary to form a second quantized representation 22b. The number of tokens in each of the first and second sets may be the same. The first set of tokens and the second set of tokens are alternative representations of the same latent representation. Accordingly, the quantization block 131 may provide as an output one, two, three or more quantized latent representations 22a, 22b. For example, the quantization block 131 may be a multi-head vector (VQ) quantization block.

The quantized latent representation 22a, 22b may be provided to the decoder neural network 140. The quantized latent representation may be of an arbitrary dimension e.g. using 64, 512, 800, 1024 tokens or quantization vectors.

In some implementations each of the at least one quantized latent representation 22a, 22b is associated with a respective GLM 160a, 160b that operates autoregressively on the associated set of tokens 22a, 22b. The GLM 160a is trained to predict the likelihood of at least one token given at least one other token of the set of tokens forming the quantized representation 22a. For example, the GLM 160a may be trained to predict at least one future token (selected from the vocabulary of tokens) given at least one previous token. The GLM 160a may be trained to predict a likelihood associated with each token in the set of tokens from the quantized latent representation 22a wherein the likelihood indicates the likelihood that the token should be at least one particular token from the associated vocabulary of tokens. That is, the GLM 160a may continuously predict new tokens given past tokens or predict a correction of a current set of tokens wherein the new or corrected predicted tokens are either the same or different from the tokens outputted by the quantization block 131. In the comparing block 132, the predicted token sequence predicted 23a is compared to the token sequence 22a output by the quantization block 131. If there is a difference for at least one predicted token in the GLM predicted set of tokens 23a and the set of tokens 22a output from the quantization block 131, a selection is made to use one of the tokens predicted in either set of tokens 22a, 23a. For example, the selection of token is based on the likelihood of the token predicted by the GLM 160a and/or encoder 120. For example, if the GLM prediction likelihood is below a predetermined likelihood threshold, the token of the quantization block 131 is block is used. By means of a further example, the token selection is based on the likelihood of each token predicted by the GLM 160a and/or the Argmin distance with respect to the non-quantized latent representation.

Analogously, and in parallel, a second GLM 160b may predict at least one future/corrected token provided at least one token of a second latent representation 22b so as to form a predicted second set of tokens 23b. Similarly, based on the likelihood of the tokens predicted by the second GLM 160b the second tokens output by the quantization block 131 is compared to the second predicted tokens output by the second GLM 160b. If a difference is detected the selection of tokens is made based on the likelihood of the second tokens predicted by the second GLM 160*b* and/or the Argmin distance to the non-quantized latent representation.

Analogously, three or more quantized latent representations may be obtained each with an associated GLM performing predictions on likely continuations/corrections of the token sequence which may differ from the actual sequence as output by the quantization block 131.

If a single quantized latent representation 22*a* and GLM 160*a* is used the most likely token sequence may be forwarded to the decoder neural network 140 to make the waveform prediction based on the quantized latent representation selected by the comparison block 132.

If more than one quantized latent representation 22*a*, 22*b* and GLM 160*a*, 160*b* are used, the respective quantized latent representation 22*a*, 23*b* selected by the comparison block 131 may be concatenated or added in the concatenation block 133 to form an aggregate representation 24. Accordingly, the bitrate may be increased by concatenating additional quantized representations 22*a*, 23*b* and forwarding the aggregated representation 24 to the decoder neural network 140.

The GLM 160*a*, 160*b* is a discrete autoregressive model trained with a maximum likelihood criterion. Each GLM 160*a*, 160*b* may be configured to operate similarly to a language model in the natural language processing domain. Hence several neural architectures may be used to perform the task of the GLM 160*a*, 160*b* such as one or more causal convolutional networks, recurrent neural networks or self-attention models. The GLM 160*a*, 160*b* may add a capability of performing longer-term predictions in addition to the causal adversarial auto-encoder due to its generative nature. Arbitrarily large continuations of a latent representation may be predicted by the GLM(s) 160*a*, 160*b*. It is noted that the quantization and GLM(s) 160*a*, 160*b* are optional and may be added to the causal adversarial auto-encoder so as to enable facilitated longer term predictions. For instance, the GLM(s) 160*a*, 160*b* may be operated adaptively and only activated in response to substitute signal portions exceeding a threshold duration.

Figure 3A:
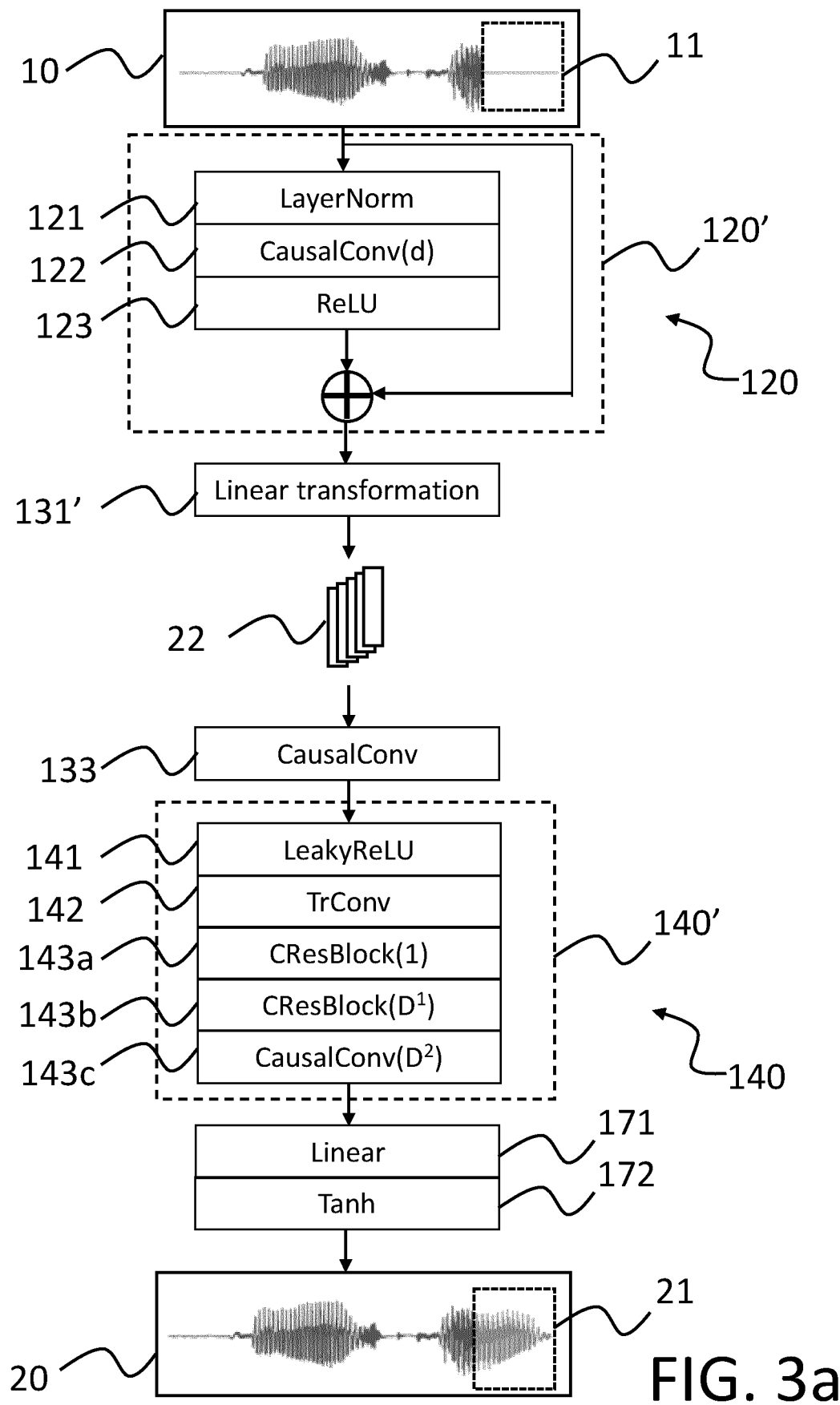
FIG. 3a shows a detailed view of a causal auto-encoder according to one exemplary embodiment of the present disclosure.

FIG. 3*a* depicts a detailed exemplary implementation of the causal adversarial auto-encoder. The encoder neural network 120 may comprise one or more encoder blocks 120' each comprising one or more neural network layers 121, 122, 123. Multiple encoder blocks 120' may be cascaded with each encoder block 120', each block having the same structure. In one implementation one encoder block 120' may comprise a normalization layer 121. Layer normalizations may help to accelerate the model's convergence and contribute to yielding a better signal reconstruction quality. The normalization layer 121 may be followed by a causal convolutional layer 122 configured to perform causal convolution. The causal convolutional layer 122 may use weight normalization as it is a simple stabilization mechanism for adversarial models that generate waveforms. The causal convolutional layer 122 may be a dilated causal convolutional layer with a dilation factor d. Accordingly, the encoder 120 and encoder block 120' is easily adaptable regarding receptive field modifications thanks to the dilation factor d per encoder block 120'. In some implementations, the receptive field may be wider so as to increase the prediction quality. For example, the receptive field may be longer than 1 second, longer than 2 seconds or longer than 3 seconds. Each encoder block 120' may comprise a skip connection to facilitate training.

Some implementations comprises quantization of the latent representation output by the encoder block(s) 120'. The quantization may comprise one or more linear transformations of the output of the encoder block(s) 120'. The linear transformation may be performed by a linear transformation block 131' which outputs at least one quantized latent representation 22 which represents a reconstructed complete audio signal.

The latent representation(s) or quantized latent representation(s) 22 is provided to the decoder neural network 140. The decoder neural network may comprise one or more cascaded decoder block(s) 140' wherein each decoder block 140' comprises one or more neural network layers. Optionally the decoder block(s) 140' is preceded by a causal convolutional layer 133 which performs an initial upsampling of the latent representation or quantized latent representation 22.

In one implementation a decoder block 140' comprises a leaky ReLU (Rectified Linear Unit) layer 141. Using leaky ReLU layers 141 as non-linear activations may reduce gradient flow issues. The leaky ReLU layer 141 may be followed by a transposed convolutional layer 142 which in turn is followed by one or more residual causal convolutional blocks 143*a*, 143*b*, 143*c* with different dilation factors D. In one implementation the dilation factors D of the residual causal convolutional layers 143*a*, 143*b*, 143*c* increases, for instance the first dilation factor is 1, the second dilation factor is D and the third dilation factor is D2 wherein D is an integer. An example of the residual causal convolutional block 143*a*, 143*b*, 143*c* is illustrated in detail in FIG. 3*b* and FIG. 3*c*. Accordingly, the decoder block(s) 140' converts the latent representation or quantized latent representation 22 back to a waveform representation of a reconstructed complete audio signal 20 through a series of transposed convolutions (i.e. learnable up-sampling filters) and residual causal convolutional blocks 143*a*, 143*b*, 143*c* with different dilation factors. Alternatively, the decoder block(s) outputs a representation of a reconstructed complete audio signal 20, wherein the waveform representation of the reconstructed complete audio signal is obtained by an inverse transform unit (not shown).

In some implementations the output of the decoder block(s) 140' is provided to one or more a post processing layers 171, 172. In one exemplary implementation the post processing layers 171, 172 comprise a linear transformation layer 171 with non-linear (e.g. Tanh) activation 172.

The final sampling rate of the reconstructed complete audio signal 20 is determined by the number of transposed convolutions 142 (i.e. the number of cascaded decoder blocks 140') and their striding factors. In one implementation the decoder 140 is comprised of one or more decoder blocks 140' such as four decoder blocks 140' with different upsampling factors. For example, the upsampling factors may be 5, 4, 4, and 2 for each of the decoder blocks 140'. However, other factors may be employed and fewer or more decoder blocks 140' may be stacked to obtain any arbitrary sampling rate in the output reconstructed audio signal 20. The transposed convolutions may be restricted to be non-overlapped so that causality is not broken while upsampling (i.e., there is no overlap among transposed convolution outputs from future data).

In some implementations, the causal adversarial auto-encoder may comprise an optional cross-fading post-filtering module configured to receive at least one reconstructed signal portion 21 and a subsequent signal portion (e.g. a signal portion which is indicated to be a representation of complete audio signal portion and not a substitute signal portion) and apply a cross-fading filter (e.g. a window function) to ensure a smooth transition between the reconstructed audio signal portion 21 and the complete audio signal portion. The cross-fading filter may then be applied to the reconstructed audio signal 20. In some implementations the optional cross-fading post-filtering module comprises one or more neural networks trained to predict a cross fading filter provided at least a reconstructed signal portion and a subsequent and/or preceding portion of the complete audio signal. A benefit with using a neural network is that the neural network may be trained to adapt the predicted cross-fading filter after different acoustic conditions (e.g. noise, codec artifacts, reverberation effects) that are present in the training data.

Figure 3B:
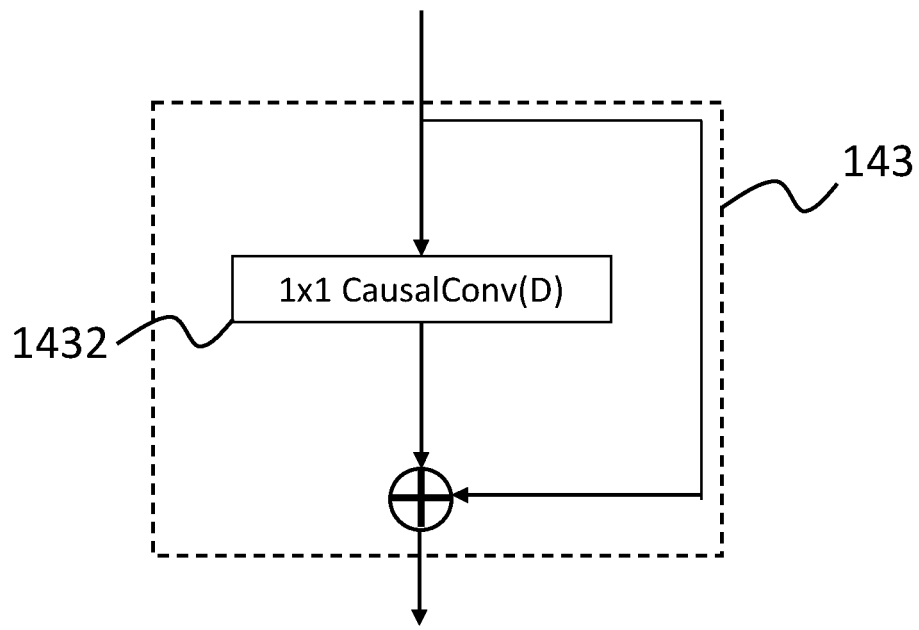
FIG. 3b shows a detailed view of a residual causal convolutional block of the decoder neural network according to some embodiments of the present disclosure.
Figure 3C:
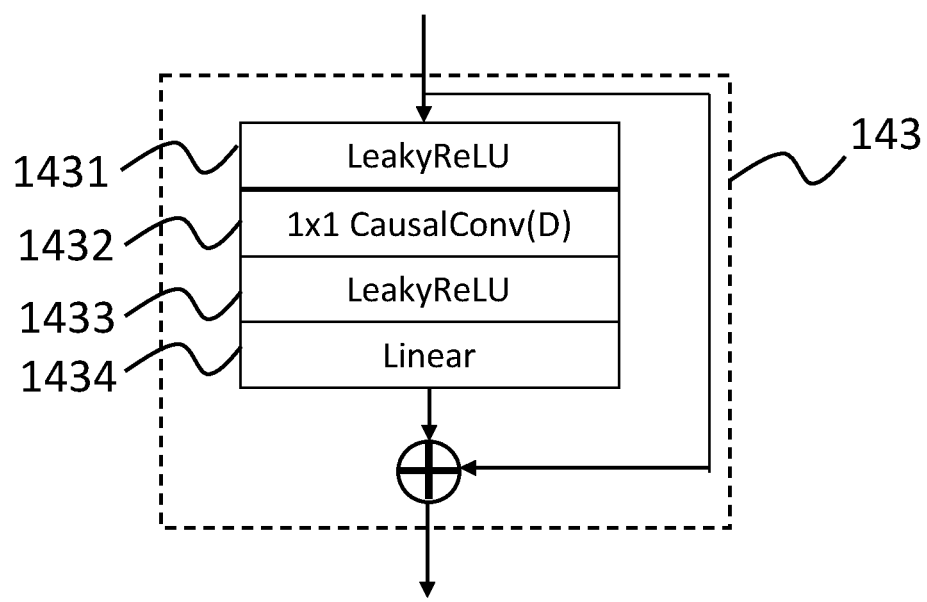
FIG. 3c shows a detailed view of an alternative residual causal convolutional block of the decoder neural network according to some embodiments of the present disclosure.

FIG. 3*b* illustrates an exemplary residual causal convolutional block 143 which comprises a 1×1 causal convolutional block 1432 with dilation factor D and a skip connection. As depicted in FIG. 3*c* the residual causal convolutional block 143 may comprise Leaky ReLU activation via a Leaky ReLU layer 1431 which precedes the causal convolutional layer 1432. Optionally, the causal convolutional layer 1432 may be followed by a second Leaky ReLU layer 1433 which in turn is followed by a linear transformation layer 1434. Each of the one or more causal convolutional block(s) 143 may comprise a respective skip connection to facilitate model training.

Figure 4A:
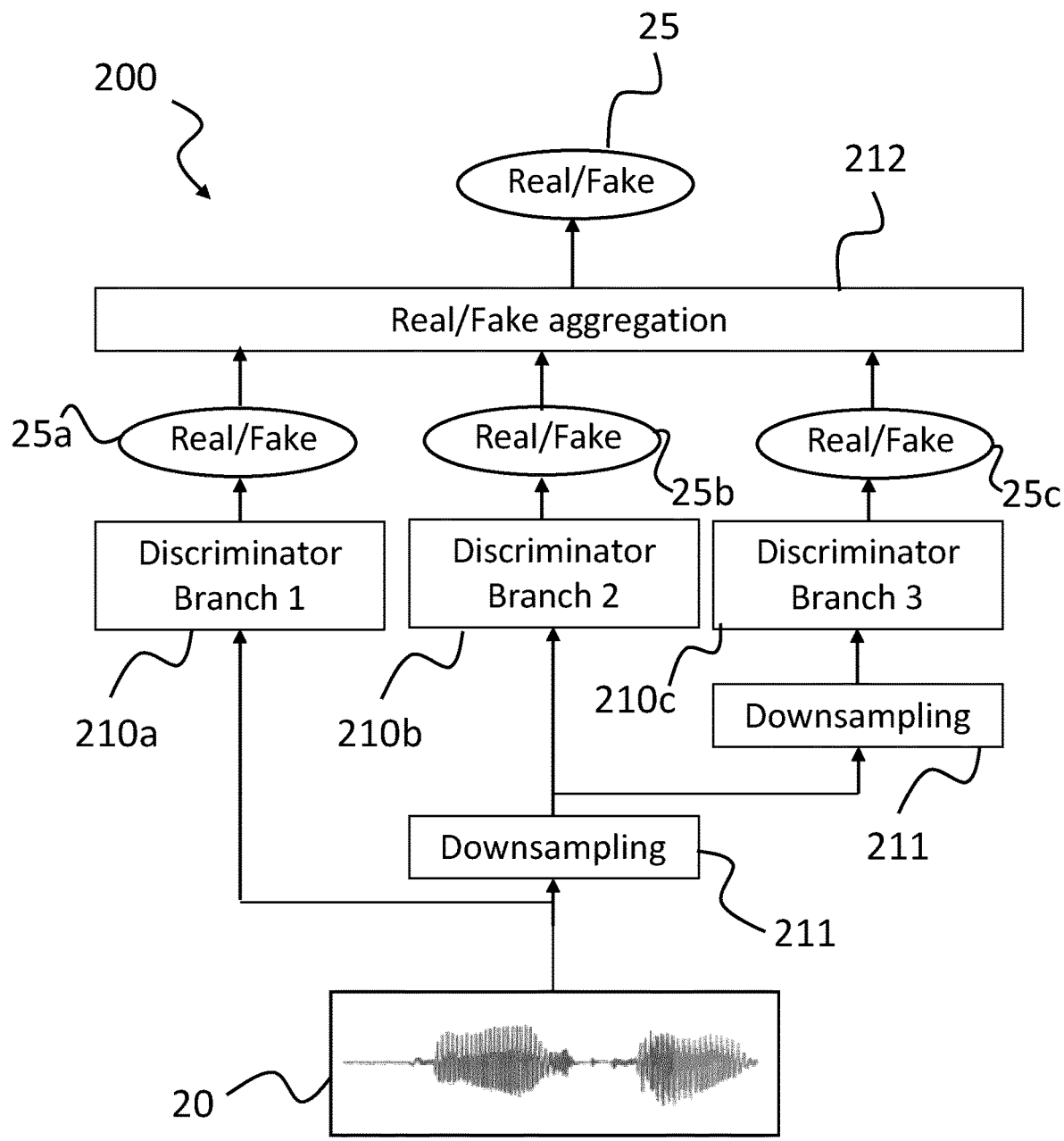
FIG. 4a shows a discriminator with three discriminator branches according to some embodiments of the present disclosure.

FIG. 4*a* depicts a discriminator 200 according to some implementations of the present disclosure. The discriminator 200 comprises a discriminator neural network, wherein the discriminator neural network may comprise a plurality of neural network layers. The discriminator 200 is trained to predict an indicator 25 indicating whether the input complete audio signal 20 represents a (fake) reconstructed audio signal or a (real) complete audio signal. The discriminator 200 may be configured to output an indicator 25 indicating whether the input data 20 represents a complete audio signal or an audio signal comprising at least a reconstructed portion. The indicator 25 may be a Boolean variable or a value, wherein the value is between 0 and 1 where 0 indicates that the input audio signal is fake and 1 indicates that input audio signal is real.

In some implementations, the discriminator 200 comprises two, three, or more discriminator branches 210*a*, 210*b*, 210*c*, each trained to predict a respective individual indicator 25*a*, 25*b*, 25*c* indicating whether the input data represents a complete audio signal or a reconstructed audio signal. In one example, a first discriminator branch 210*a* obtains a representation of the input audio signal 20 whereas a second discriminator 210*b* branch obtains a downsampled representation of the same input audio signal 20. Additionally, a third discriminator 210*c* branch may obtain a further downsampled representation of the same input audio signal 20. To this end, the second discriminator branch 210*b* may be preceded by a downsampling stage 211, whereas the third discriminator branch 210*c* is preceded by two downsampling stages 211. Each downsampling stage may perform downsampling using a same factor S or individual factors S1, S2 wherein S2≠S1.

Accordingly, each discriminator branch 210*a*, 210*b*, 210*c* predicts an individual indicator 25*a*, 25*b*, 25*c* indicating whether the input audio signal 20 appears to be a complete audio signal or a reconstructed audio signal at different sampling rates. Each indicator 25*a*, 25*b*, 25*c* is aggregated at an indicator aggregation stage 212 to form a total indicator 25 which indicates whether the input audio signal 20 is a complete audio signal or a reconstructed audio signal. The indicator aggregation stage 212 may determine the total indicator 25 based on the number of discriminator branches 210*a*, 210*b*, 210*c* indicating that the input audio signal is real or fake. The indicator aggregation stage 212 may determine the total indicator 25 based on a weighted sum of the individual indicators 25*a*, 25*b*, 25*c* of each respective discriminator branch 210*a*, 210*b*, 210*c*. The weighted sum may be weighted with a likelihood associated with each individual indicator 25*a*, 25*b*, 25*c*. Other aggregation or pooling strategies may be employed to generate the total indicator 25 from the individual indicators 25*a*, 25*b*, 25*c*. For instance, the most confident individual indicator of the individual indicators 25*a*, 25*b*, 25*c* may be taken as the total indicator 25 (max-pooling). That is, the total indicator may e.g. be an average, weighted average, or maximum of the individual indicators 25*a*, 25*b*, 25*c*.

Figure 4B:
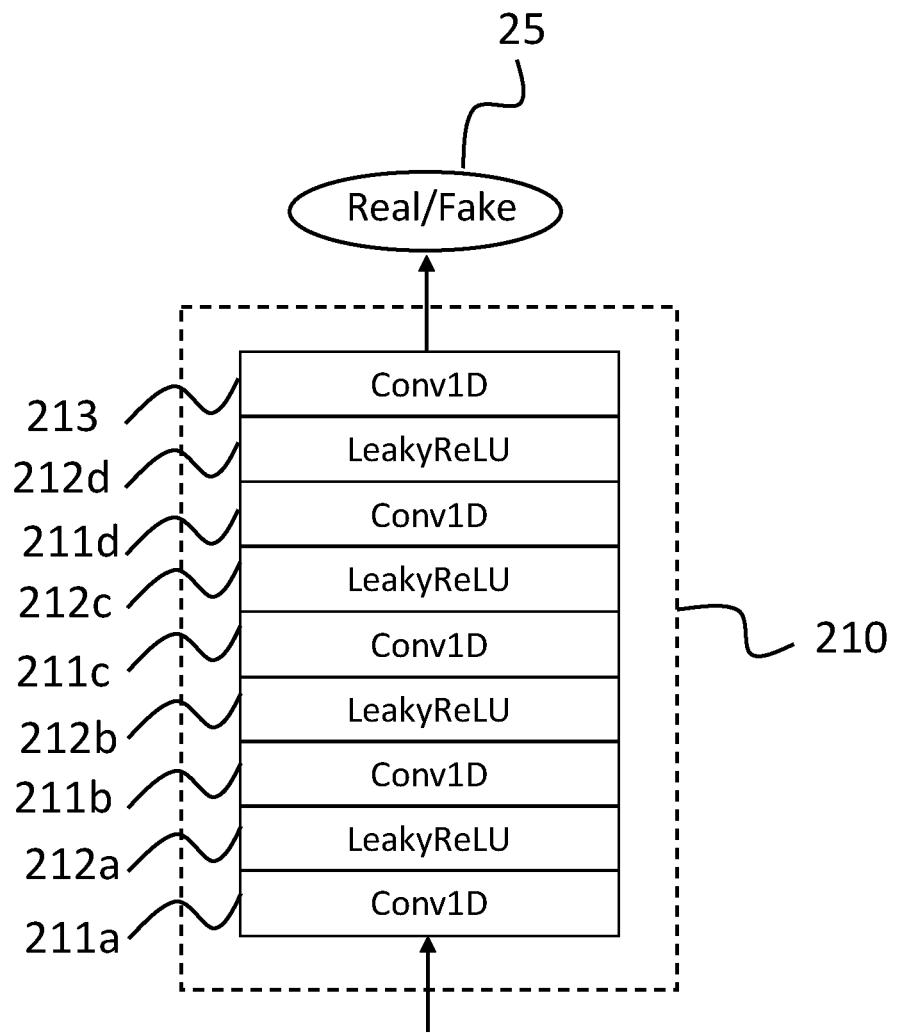
FIG. 4b shows a detailed view of a discriminator according to an exemplary implementation of the present disclosure.

FIG. 4*b* illustrates a detailed view of a discriminator 210 or discriminator branch 210. A reconstructed complete audio signal or a complete audio signal is provided as the input the discriminator 210 which is configured to predict an indicator 25 indicating the likelihood that the input is a reconstructed complete audio signal 20 or a complete audio signal which has not been reconstructed using the neural system described in the above. The discriminator may comprise multiple neural network layers 211*a*, 212*a*, 211*b*, 212*b*, 211*c*, 212*c*, 211*d*, 212*d*. For example, the multiple neural network layers 211*a*, 212*a*, 211*b*, 212*b*, 211*c*, 212*c*, 211*d*, 212*d* may be a stack of subblocks wherein each subblock comprises a convolutional layer 211*a* and a Leaky ReLU activation layer 212*a*. Each convolutional layer 211*a*, 211*b*, 211*c*, 211*d* may be configured to downsample by a factor S. The convolutional layers 211*a*, 211*b*, 211*c*, 211*d* of the discriminator may have comparatively large kernels, e.g. the kernels may be 10 times the stride+1. In the discriminator 210, the resolution in time of each feature map is reduced, and the number of features grows to compensate the time-dimension reduction. An output convolutional layer 213 may be configured to perform the final prediction of the indicator 25 for the discriminator 210. All convolutional layers in the discriminator may use weight normalization to facilitate training stabilization.

Figure 5:
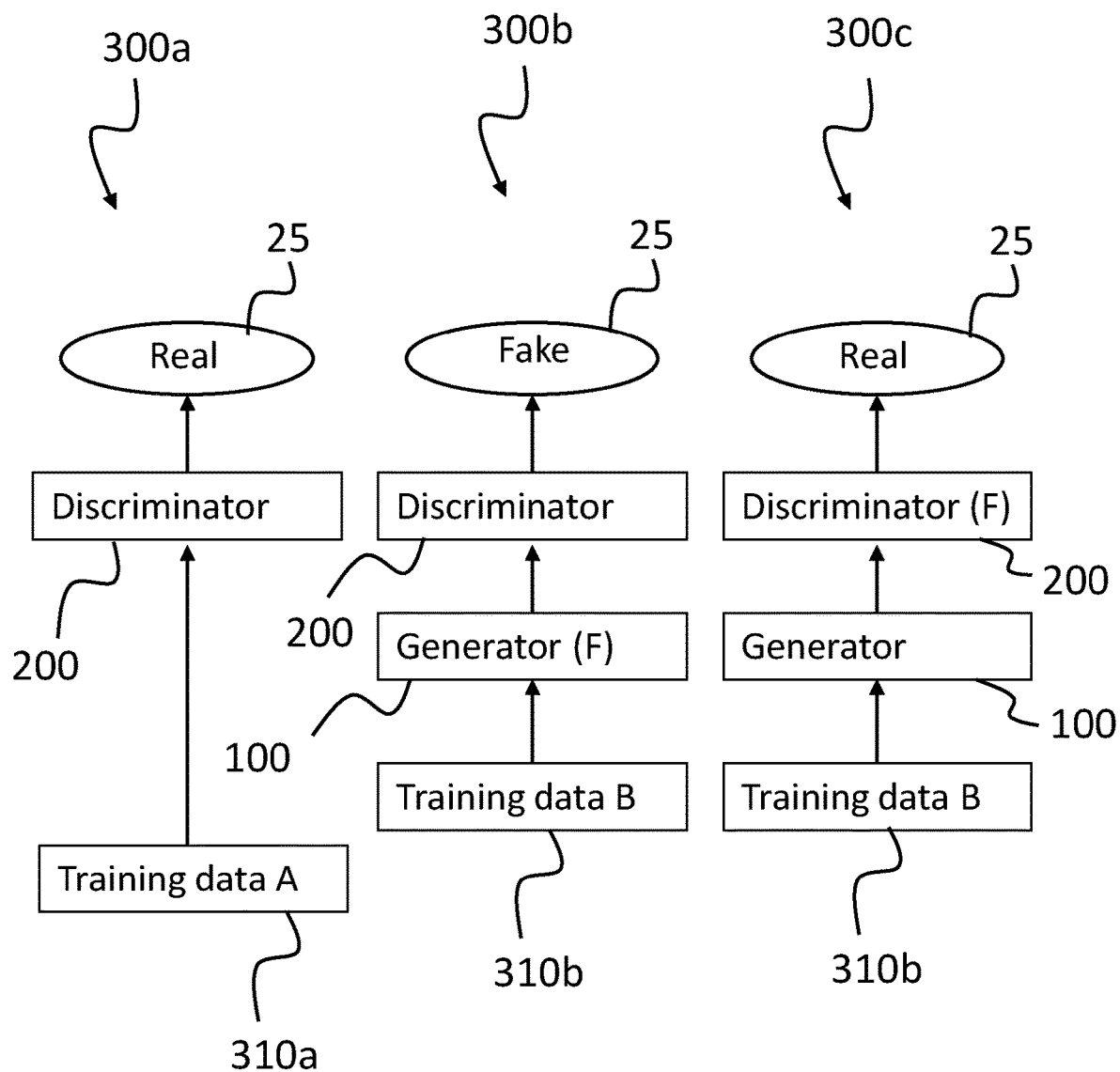
FIG. 5 illustrates the training process employed during generator-discriminator training according to some embodiments of the present disclosure.

With reference to FIG. 5 there is illustrated an exemplary Generative Adversarial Network (GAN) comprising two neural networks, a generator neural network 100 and a discriminator neural network 200, that are trained together with opposite objectives. The generator neural network 100, referred to as the generator 100, learns to imitate the structure embedded in the training data 310*b* provided to the generator 100 such that the generator 100 can generate more samples that would be a plausible alternative to the ones existing in the training data 310*b*.

In GAN training, the training data 310*b* input to the generator 100 may be a vector of random noise samples z with some distribution Z. The distribution may be a uniform or Gaussian distribution while other distributions are possible. This would make the generator 100 a generator of random samples that resemble the samples of the training data 310*b*. Additionally or alternatively, training data 310*a* which comprises an example of audio data (e.g. recorded speech or general audio) may be used as the training data during GAN training. For instance, incomplete training data may be used wherein the generator 100 is tasked with predicting the continuation of the training signal as realistically as possible or fill-in a substitute (missing) signal portion of the training data. For example, if the training data 310*a*, 310*b* comprises a current melspectrogram, the generator 100 may generate future melspectrograms that fits as a realistic continuation of the current melspectrogram.

On the other hand, the discriminator neural network 200, referred to as the discriminator 200, is trained to detect whether the generated data output by the generator 100 is a reconstructed (fake) version of the original (real) data. The discriminator 200 may be simply seen as a classifier that identifies whether an input signal is real or fake. The discriminator 200 may be seen as a learnable (non-linear) loss function as it replaces and/or compliments a specified loss function for use during training.

The training process is summarized in FIG. 5. In a first training mode 300b, the discriminator 200 learns to classify whether the input comes from the training dataset 310a, 310b or the generator 100. In the first training mode, the internal weights of the generator 100 are not modified (i.e. the generator 100 is not learning and is in a frozen state) while the internal weights of the discriminator are updated so as to recognize the output from the generator 100 as fake. In the second training mode 300c, the discriminator 200 is frozen while the internal weights of the generator 100 are updated so as to make the output of the discriminator 200 misclassify the predicted output from the generator 100 as a real signal. That is, if the generator 100 is successful in the second training mode 300c the generator 100 is able to reproduce a reconstructed signal well enough to succeed in making the discriminator 200 misclassify the input as an original (real) signal. By alternating between the first training mode 300b and the second training mode 300c and/or using different training data the generator 100 and discriminator 200 are trained together.

Optionally, the discriminator 200 may be trained in a third training mode 300a using training data 310a representing a complete audio signal. In the third training mode the internal weights of the discriminator 200 are updated so as to classify the training data 310a which represents a complete signal as real.

The training data 310a, 310b may comprise at least one example of an audio signal comprising speech. For example, the training data 310a, 310b may comprise a variant of or a mixture of publicly available datasets for speech synthesis, such as VCTK and LibriTTS. Both of these may be resampled at 16 kHz, but the model may be adaptable to work at higher and lower sampling rates as well, e.g. by adjusting the decoder strides. The training data 310a, 310b may comprise clean speech, but additional training data 310a, 310b may be obtained by augmenting the clean speech to introduce codec artifacts which may emulate the artifacts that might be present in real communication scenarios. For instance, for each utterance in the training data 310a, 310b one of the following codecs may be applied randomly with a random bitrate amongst the possible ones:
  Opus: 1.6, 3.2, 24, 32 kbps
  G722.1: 24, 32 kbps
  AMRWB: 6.6, 8.85, 12.65, 14.25, 15.85, 18.25, 19.85, 23.05, 23.85 kbps.

The above listed codecs are only exemplary and additional or other codecs may be used as an alternative to the above. For example, a codec with possible bitrates of 6.4, 8, 9.6, 11.2, 12.8, 14.4, 16, 17.6, 19.2, 20.8, 22.4, 24, and 32 kbps may be used.

Additionally, the training data 310a, 310b may be further augmented by the addition of noise, reverberation, and other acoustic variabilities such as number of speakers, accents, or languages coming from other dataset sources.

The training data 310a, 310b may be augmented by randomly replacing portions of the training data audio signal with a substitute signal portion of random length. The portions which are replaced with a substitute signal portion may correspond to the audio signal portions of one or more packets and/or frames. For example, the training data 310a, 310b may be augmented by omitting one or more packets and/or frames of a packetized or frame representation of the training data audio signal wherein each omitted packet and/or frame is replaced with a substitute signal portion of corresponding length. Additionally or alternatively, two portions of a training data audio signal may be swapped or an audio signal of a second training data audio signal may be added as a substitute audio signal portion of a first training data audio signal. That is, the training data 310a, 310b may comprise a concatenation of two chunks that belong to different utterances, therefore provoking a sudden linguistic mismatch. Accordingly, the generator and discriminator may be trained with another loss that enforces linguistic content continuity. Preferably, the two mismatched audio signal portions are real signal portions such that the discriminator learns to detect incoherent contents and the generator learns to generate realistic (in signal quality) and coherent (linguistically).

The training data 310a, 310b may define a past audio signal wherein the generator 100 is trained to construct a plausible future continuation of given the past audio signal so as to succeed in making the discriminator 200 misclassify the constructed future signal as an a real audio signal. For example, if operating with melspectrogram representations, the generator 100 should generate future trajectories that look like real melspectrograms and that fit as continuations of a past or current melspectrogram. Additionally or alternatively, the training data 310a, 310b may be random noise samples drawn from a predetermined noise distribution (e.g. a Gaussian or uniform distribution) wherein the generator 100 is tasked with reconstructing substitute signal portion or constructing a future signal given the noise training data so as to succeed in making the discriminator 200 misclassify the reconstructed noise data.

Figure 6:
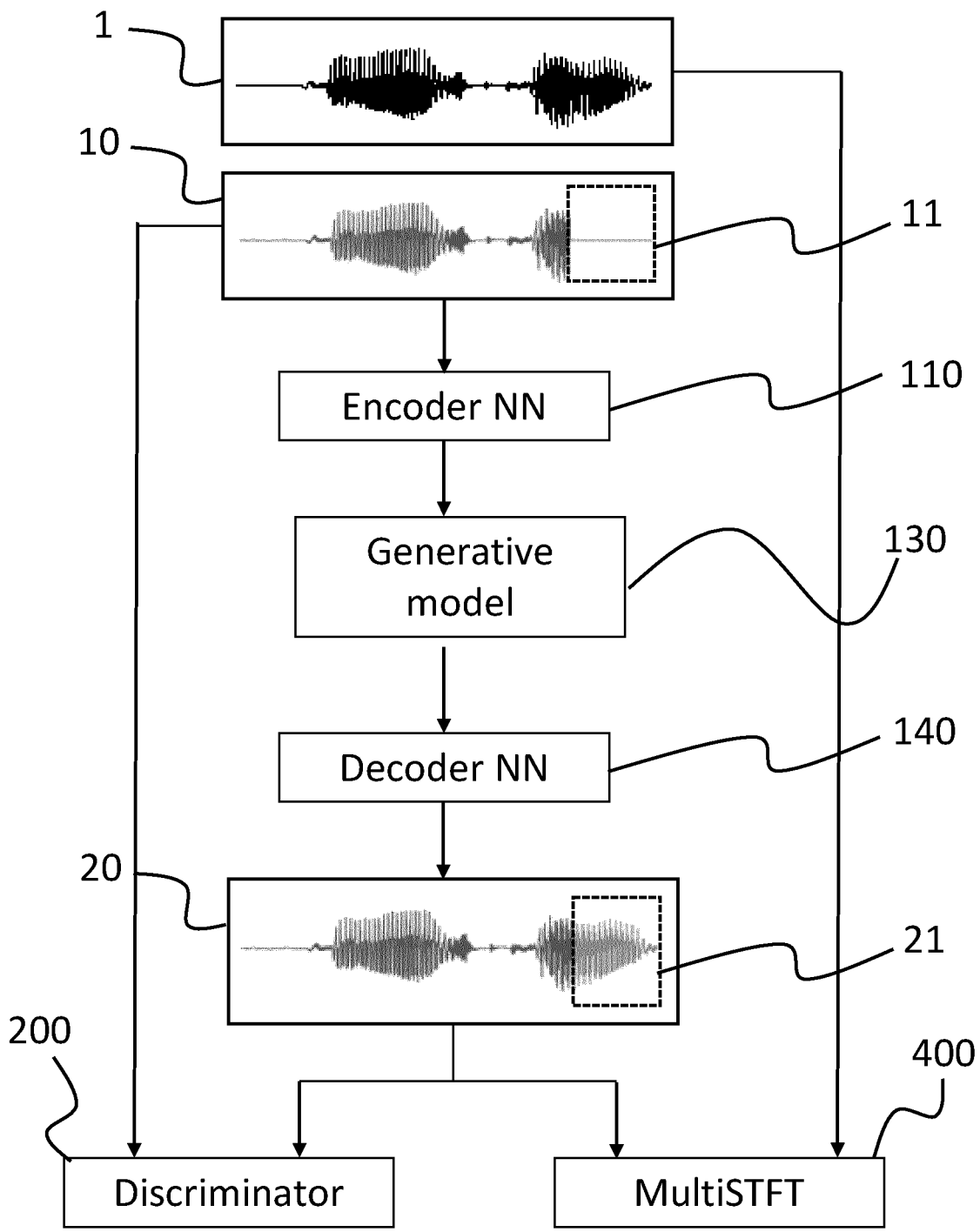
FIG. 6 shows an exemplary training setup for the causal auto-encoder according some embodiments of the present disclosure.

FIG. 6 depicts an exemplary training setup for the causal adversarial auto-encoder. The causal adversarial auto-encoder comprises the encoder neural network 110, optionally the generative model 130, and the decoder neural network 140. The generative model 130 may comprise a quantization block so as to operate with quantized latent representations and comprise at least one generative latent model (GLM) which is trained together with the rest of the causal adversarial auto-encoder. During training, the causal adversarial auto-encoder learns to reconstruct an incomplete audio signal 10 which comprises a substitute signal portion 11 to form a reconstructed complete audio signal 20 comprising a reconstructed signal portion 21 which replaces the substitute signal portion 11. Ideally, the reconstructed audio signal 20 is similar and/or identical to the complete audio signal 1. These reconstructions may be learned through one of, or a combination of, two losses that operate upon the reconstructed audio signal 20, namely the multi-STFT loss 400 and the adversarial (discriminator) loss 200. The multi-STFT minimizes the difference of magnitudes between the predicted reconstructed audio signal 20 and the complete audio signal 1. Preferably, this difference is computed at different time-frequency resolutions. The multi-STFT loss 400 helps the model converge faster and achieve better quality than if only the adversarial loss obtained with the discriminator 200 is used. However, the multi-STFT loss 400 may not be sufficient to generate good quality speech due to it lacking a phase reconstruction objective. Hence a model trained only with the multi-STFT may sound robotic and with artifacts in speaker identity and prosody although the reconstructed signal may be completely intelligible.

In some implementations the adversarial loss may be obtained for the reconstructed audio signal 20. Moreover, the training may be conducted based on a conjunction of the multi-STFT 400 loss and adversarial loss obtained with the discriminator 200. Other regression losses like L1-loss may be used as an alternative to, or in addition to, the adversarial loss and/or the multi-STFT loss 400. Other deep feature losses may also be utilized, such as regressions of features extracted through deep neural speech encoders such as PASE or contrastive losses that enrich the knowledge on context such as contrastive predictive coding.

For example, the discriminator 200 may comprise a plurality of branches wherein an indicator of each branch is aggregated to form a final aggregation loss. The mean squared error may be used to aggregate the losses and provide value of 0 when its input is fake and 1 when its input is real. The model may then be a least-squares GAN formulation, while other formulations like Hinge or Wasserstein are applicable as well.

Once the causal adversarial auto-encoder is trained, it can be used in inference mode with or without the quantization and/or the generative latent model. The substitute signal portion 11 is indicated in the inference mode with the same pattern as in the training mode (e.g. by zeros that cover the length of the gap). However, by training the causal adversarial auto-encoder with another type of substitute of signal portion 10, any other type of substitute signal portion pattern may be used.

An additional substitute indicator may be received together with the substitute signal portion 10 itself. The additional substitute signal indicator may be included as metadata, and may indicate that the substitute signal portion 10 is an actual substitute portion and not a part of the complete audio signal 1. If melspectrograms are used to represent the audio signal, the additional substitute indicator may be concatenated as an additional frequency channel in the melspectrogram.

Using the additional substitute indicator, the causal adversarial auto-encoder may select to replace only the substitute signal portion with a reconstructed signal portion while keeping the other portions of the incomplete audio signal intact. In doing so, the causal adversarial auto-encoder may perform a cross-fading operation by applying a window function to smoothly transition between the incomplete audio signal and the reconstructed signal portion of the incomplete audio signal to form the reconstructed audio signal 20. In some implementations, the cross-fading operation is performed when a future portion of the complete audio signal 1 is available, meanwhile zeros (or any other substitute signal pattern) is appended to the incomplete audio signal 20. Additionally or alternatively, the causal adversarial auto-encoder reconstructs several frames of the audio signal in one inference step and keeps the frames buffered until a next packet (comprising one or more frames) is received. During this time a window function may be slid over the buffered frames to save the number of interference steps per unit of time for the audio signal.

Figure 7:
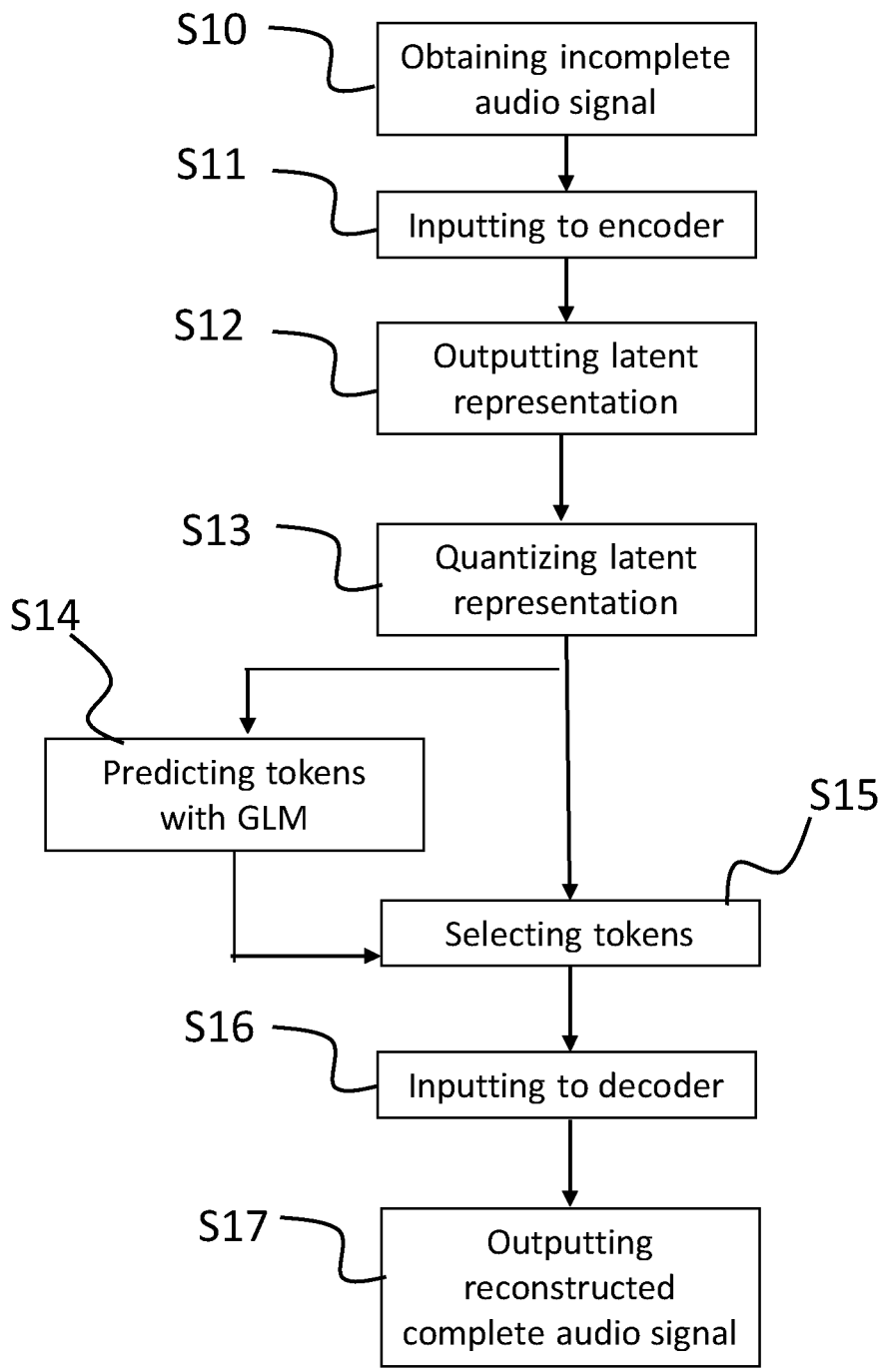
FIG. 7 shows a flowchart illustrating a method for performing packet loss concealment according to some embodiments of the present disclosure.

FIG. 7 illustrates a flowchart describing a method according to embodiments of the present disclosure. At S10 an incomplete audio signal, or a representation of an incomplete audio signal, is received wherein the incomplete audio signal comprises a substitute signal portion replacing an original signal portion. The incomplete audio signal (or representation thereof) is provided to an encoder neural network at S11 which outputs a latent representation of a reconstructed audio signal at S12. The reconstructed complete audio signal may be quantized at optional step S13 to form a quantized representation of the reconstructed audio signal which comprises a set of tokens. The at least one quantized latent representation is provided to a respective GLM at S14 which predicts an updated set of (more likely) tokens given at least one token of the quantized representation. At S15, the tokens of the quantized (original) representation are compared to the tokens predicted by the GLM at S14. If there is a difference, a selection of the most likely tokens is made to form a final predicted set of tokens. The final predicted set of tokens is inputted to the decoder neural network at S16, and at S17 the decoder neural network outputs a reconstructed audio signal in the time domain (a waveform) or a representation of the reconstructed audio signal. Optionally, S17 is followed by post processing which may involve performing an inverse transform or cross-fading-filtering as described in the above.

Figure 8:
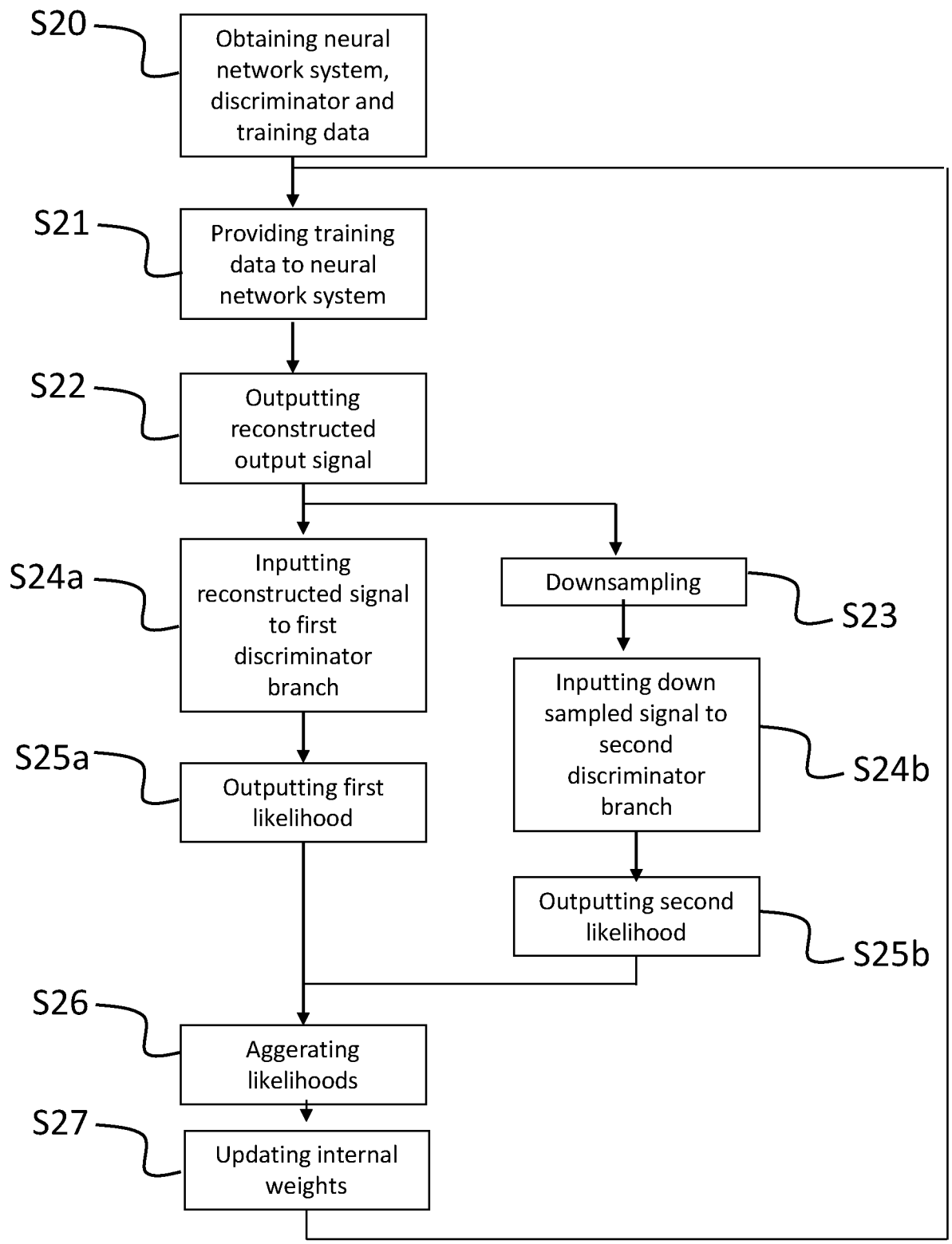
FIG. 8 shows a flowchart illustrating a method for training a causal auto-encoder with a discriminator according to some embodiments of the present disclosure.

FIG. 8 illustrates a flowchart which describes a method for training the causal auto-encoder according to embodiments of the present disclosure. At S20 a neural network system (e.g. an implementation of the causal auto-encoder) is provided alongside a discriminator neural network and training data. At S21 the training data is provided to the neural network system, and at S22 a reconstructed audio signal (or representation thereof) is output by the neural network system. For example, the neural network system has replaced a substitute signal portion of the training data signal with a reconstructed signal portion or has predicted a reconstructed future continuation of the training data audio signal. At S24a, the reconstructed audio signal is provided to a discriminator which outputs a first likelihood (indicator) indicating whether the reconstructed audio signal is a complete audio signal or not at S25a. Optionally, a second discriminator branch receives the reconstructed audio signal output at S22 and downsamples the reconstructed audio signal (or representation thereof) at S23 prior to providing the downsampled reconstructed audio signal (or representation thereof) to a second discriminator (discriminator branch) at S24b. At S25a the second discriminator outputs a second likelihood indicating whether the downsampled audio signal (or representation thereof) is a complete audio signal or a reconstructed audio signal. At S26 the likelihoods of each discriminator branch are aggregated to form a final likelihood indicating whether the reconstructed audio signal is a complete audio signal or a reconstructed audio signal. At S27 the internal weights of either the discriminator or the neural network system is updated in accordance with generator-adversarial training as described in the above. As seen, the method may repeat after S27 and comprise updating the internal weights of the other one of the discriminator and the neural network system in the next pass and/or provide and use new training data in the next pass.

In the above, possible methods of training and operating a deep-learning-based system for determining an indication of an audio quality of an input audio sample, as well as possible implementations of such system have been described. Additionally, the present disclosure also relates to an apparatus for carrying out these methods. An example of such apparatus may comprise a processor (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory coupled to the processor. The processor may be adapted to carry out some or all of the steps of the methods described throughout the disclosure.

The apparatus may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not limited to, data repositories in the form of solid-state memories, optical media, and magnetic media, for example.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE1. A deep learning generator for real-time packet loss concealment for a lossy audio signal, the generator comprising:
an encoder stage comprising:
a plurality of encoder layers, wherein a first encoder layer of the plurality of encoder layers is configured to be feed-forward connected to a second encoder layer of the plurality of encoder layers, the first encoder layer further configured to have a skip connection to a summation block at an output of the encoder;
wherein the encoder stage is configured to:
receive a waveform audio signal as input; and
extract a plurality of features of the waveform audio signal and output said features into a fixed representation via a context vector; and
a decoder stage comprising:
a plurality of decoder layers, wherein a first decoder layer of the plurality of decoder layers is configured to be feed-forward connected to a second decoder layer of the plurality of decoder layers, the first decoder layer further configured to have a skip connection to a summation block at an output of the decoder; and
wherein the decoder stage is configured to convert the context vector into a sequence of N predicted output frames.

EEE2. The deep learning generator of EEE 1, wherein the features comprise at least one of spoken content, prosody, and speaker identity.

EEE3. The deep learning generator of EEE 1, wherein the deep learning generator is configured to work autoregressively, such that each frame in the sequence of N predicted output frames is fed back as an input into the encoder stage at each future time-step of a plurality of future time-steps.

EEE4. The deep learning generator of EEE 1, wherein each layer of the plurality of encoder layers is comprised of a convolutional layer.

EEE5. The deep learning generator of EEE 4, wherein the convolutional layer is a CausalConvBlock.

EEE6. The deep learning generator of EEE 1, wherein each layer of the plurality of decoder layers is comprised of a DecoderBlock.

EEE7. The deep learning generator of EEE 6, wherein the DecoderBlock comprises a deep residual fully connected structure.

EEE8. The deep learning generator of EEE 7, wherein the structure comprises a normalization, an activation function, and a fully connected layer.

EEE9. The deep learning generator of EEE 1, wherein a reconstructed signal is output from the decoder stage, wherein the reconstructed signal comprises the N predicted output frames added together with overlapped frames from the waveform audio signal input.

EEE10. A deep learning system for real-time packet loss concealment for an audio signal that includes a lost portion of the audio signal, the system comprising:
an encoder stage comprising:
    a plurality of convolutional blocks configured to extract one or more features of a waveform representation of the audio signal, wherein the one or more features are represented in a latent space; and
a decoder stage comprising:
    a plurality of transposed convolutions and residual causal convolutional layers configured to convert the one or more features into waveform samples that include a waveform reconstruction of the lost portion of the audio signal.

EEE11. The deep learning system of EEE 1, wherein the encoder stage further comprises a receptive field of at least 600 milliseconds.

EEE12. The deep learning system of EEE 1 or 2, wherein the encoder stage further comprises a multi-head vector-quantization block configured to quantize the latent space representation of the one or more features.

EEE13. A method for real-time packet loss concealment for an audio signal that includes a lost portion of the audio signal, the method comprising:
performing a transform on the audio signal to determine a waveform representation of the audio signal;
converting the waveform representation into a latent representation of the audio signal;
reconstructing the waveform representation of the audio signal from the latent representation of the audio signal, wherein the reconstructed waveform representation includes a learned reconstruction of the lost portion of the audio signal; and
performing an inverse transform on the reconstruction of the waveform representation to output the audio signal that includes the reconstructed lost portion of the audio signal.

EEE14. The method of EEE 4, further comprising quantizing the latent representation of the audio signal prior to reconstruction.

EEE15. The method of EEE 4 or 5, wherein reconstructing the waveform representation of the audio signal comprises determining the learned reconstruction of the lost portion of the audio signal by conjugating a plurality of loss functions that operate upon the reconstruction of the waveform representation of the audio signal.

EEE16. The method of EEE 6, wherein the plurality of loss functions comprises multi-STFT loss and adversarial loss.

EEE17. The method of any of EEEs 4-7, wherein the transform is a short-time Fourier transform (STFT).

The invention claimed is:

1. A method for packet loss concealment of an incomplete audio signal, the incomplete audio signal comprising a substitute signal portion replacing an original signal portion of a complete audio signal, the method comprising:
    obtaining a representation of the incomplete audio signal;
    inputting the representation of the incomplete audio signal to an encoder neural network trained to predict a latent representation of a complete audio signal given a representation of an incomplete audio signal;
    outputting, by the encoder neural network, a latent representation of a predicted complete audio signal;
    quantizing the latent representation of the complete audio signal to obtain a quantized latent representation, wherein the quantized latent representation is formed by selecting a set of tokens out of a predetermined vocabulary set of tokens;
    conditioning, with at least one token of the quantized latent representation, a generative neural network, wherein the generative neural network is trained to predict a token of the set of tokens provided at least one different token of the set of tokens;
    outputting by the generative neural network a predicted token of the latent representation and a confidence metric associated with the predicted token;
    based on the confidence metric of the predicted token, replacing a corresponding token of the quantized latent representation with the predicted token,
    inputting the quantized latent representation of the predicted complete audio signal to a decoder neural network trained to predict a representation of a complete audio signal given a latent representation of a complete audio signal; and
    outputting, by the decoder neural network, a representation of the predicted complete audio signal comprising a reconstruction of the original portion of the complete audio signal, wherein said encoder neural network and said decoder neural network have been trained with an adversarial neural network.

2. The method according to claim 1, wherein the quantized latent representation is a first quantized latent representation, the method further comprising:
    quantizing the latent representation of the complete audio signal to obtain a second quantized latent representation, wherein the second quantized latent representation is formed by selecting a second set of tokens out of a second predetermined vocabulary set of tokens; and
    inputting the first and second quantized latent representation to the decoder neural network.

3. The method according to claim 2, wherein each token is represented by a quantization vector and wherein inputting the first and second quantized latent representation to the decoder neural network comprises:
    concatenating or adding the quantization vectors of the first quantized latent representation with corresponding quantization vectors of the second quantized latent representation.

4. The method according to claim 2, further comprising:
providing the second quantized latent representation to a second generative neural network, wherein the second generative neural network is trained to predict a token of the second set of tokens given at least one different token of the second set of tokens;
outputting by the second generative neural network a predicted token of the second latent representation and a confidence metric associated with the predicted token; and
based on the confidence metric of the predicted token of the second latent representation, replacing a corresponding token of the second quantized latent representation with the predicted token of the second generative neural network.

5. The method according to claim 1, further comprising:
obtaining at least one random variable, and
inputting the at least one random variable to the decoder neural network, wherein the decoder neural network is trained to predict a representation of the complete audio signal given the latent representation of a complete audio signal and the at least one random variable.

6. The method according to claim 1, further comprising:
transforming the incomplete audio signal into the representation of the incomplete audio signal.

7. The method according to claim 1, wherein outputting, by the decoder neural network, a representation of the predicted complete audio signal comprises outputting a time domain representation of the predicted complete audio signal.

8. The method according to claim 1, further comprising:
inverse transforming the representation of the predicted complete audio signal into a time domain predicted complete audio signal.

9. The method according to claim 1, wherein the representation is one of a frequency representation, a time representation, a filter bank representation and/or a feature domain representation.

10. The method according to claim 9, wherein the representation is Mel-frequency cepstral coefficients or a short-time Fourier transform.

11. The method according to claim 1, wherein the decoder neural network comprises at least one causal convolutional layer and at least one subsequent residual layer, the method further comprising:
performing causal up-sampling by the causal convolutional layer to form an up-sampled representation; and
transforming the up-sampled representation by the at least one residual layer.

12. The method according to claim 2, further comprising:
determining a window function based on the reconstructed original portion of the predicted complete audio signal and a directly subsequent portion of the audio signal; and
applying the determined window function on the reconstructed original portion of the predicted complete audio.

13. The method according to claim 12, wherein determining a window function comprises:
inputting a representation of the reconstructed original portion of the predicted complete audio signal and the directly subsequent portion of the predicted complete audio signal to a window function neural network trained to predict a window function given a reconstructed audio signal portion and the subsequent portion of the audio signal.

14. A computer implemented neural network system for packet loss concealment of an audio signal, wherein the audio signal comprises a substitute signal portion replacing an original signal portion of a complete audio signal, said system comprising:
an input unit, configured to obtain a representation of the incomplete audio signal,
an encoder neural network trained to predict a latent representation of a complete audio signal given a representation of an incomplete audio signal and configured to receive the representation of the incomplete audio signal and output a latent representation of a predicted complete audio signal,
a quantization block, configured to quantize the latent representation of the complete audio signal to obtain a quantized latent representation, wherein the quantized latent representation is formed by selecting a set of tokens out of a predetermined vocabulary set of tokens,
a generative neural network, wherein the generative neural network being trained to predict a token of the set of tokens provided at least one different token of the set of tokens, the generative neural network being configured to be conditioned with at least one token of the quantized latent representation and outputting a predicted token of the latent representation and a confidence metric associated with the predicted token,
wherein, based on the confidence metric of the predicted token, replacing a corresponding token of the quantized latent representation with the predicted token,
a decoder neural network trained to predict a representation of a complete audio signal given a quantized latent representation of a complete audio signal, and configured to receive the latent representation of the predicted complete audio signal and output a representation of a complete audio signal,
an output unit configured to output a representation of the predicted complete audio signal comprising a reconstruction of the original portion of the complete audio signal, wherein said encoder neural network and said decoder neural network have been trained with an adversarial neural network.

15. A method for training a neural network system for packet loss concealment, the method comprising:
obtaining the neural network system for packet loss concealment of claim 11;
obtaining a discriminator neural network;
obtaining a set of training data; and
training the neural network system in conjunction with the discriminator neural network using the set of training data in generative-adversarial training mode by providing the set of training data to the neural network system and providing an output of the neural network system to the discriminator neural network.

16. The method for training a neural network system for packet loss concealment according to claim 15, wherein the training data comprises a random noise signal.

17. The method for training a neural network system for packet loss concealment according to claim 15, wherein the training data comprises at least one example of a recorded audio signal.

18. The method for training a neural network system for packet loss concealment according to claim 15, wherein the discriminator neural network comprises two neural network branches, the method further comprising:
providing an output of the neural network system to a first neural network branch of said two neural network branches, said output comprising a representation of an audio signal with a reconstructed audio signal portion, outputting by the first neural network branch a likelihood measure that the output of the neural network system comprises a representation of a reconstructed audio signal portion;

down-sampling the output of the neural network system;

providing the down-sampled output of the neural network system to a second neural network branch of said two neural network branches;

outputting by the second neural network branch a second likelihood measure that the down-sampled output of the neural network system comprises a representation of a reconstructed audio signal portion;

determining an aggregate likelihood measure based on the likelihood measure and the second likelihood measure; and using the aggregate likelihood measure in the generative-adversarial training.

19. The method for training a neural network system for packet loss concealment according to claim 15, wherein the discriminator network outputs a likelihood measure indicating the likelihood that the output of the neural network system comprises a complete audio signal and wherein training the neural network system in conjunction with the discriminator neural network comprises:

performing training in a first and second mode of operation, wherein the first mode of operation comprises:
inputting the set of training data to the neural network system,
changing the internal weights of the discriminator neural network to decrease the likelihood measure,
maintaining the internal weights of the neural network system, the second mode of operation comprises:
inputting the set of training data to the neural network system,
changing the internal weights of the neural network system to increase the likelihood measure,
maintaining the internal weights of the discriminator neural network.

20. The method for training a neural network system for packet loss concealment according to claim 19, further comprising providing a second set of training data, wherein the second set of training data comprises at least one example of audio data, performing training in a third mode of operation, wherein the third mode of operation comprises:
inputting the second set of training data to the discriminator neural network, and
changing the internal weights of the discriminator neural network to increase the likelihood measure.

* * * * *